US008570348B2

(12) United States Patent
Wang

(10) Patent No.: US 8,570,348 B2
(45) Date of Patent: Oct. 29, 2013

(54) BRIGHTNESS ADJUSTER, ADJUSTMENT METHOD, AND ELECTRONIC SYSTEM UTILIZING THE SAME

(75) Inventor: Shou-Cheng Wang, Jhubei (TW)

(73) Assignee: Chimei Innolux Corporation, Chu-Nan (TW)

( * ) Notice: Subject to any disclaimer, the term of this patent is extended or adjusted under 35 U.S.C. 154(b) by 487 days.

(21) Appl. No.: 12/559,442

(22) Filed: Sep. 14, 2009

(65) Prior Publication Data

US 2010/0066913 A1 Mar. 18, 2010

(30) Foreign Application Priority Data

Sep. 15, 2008 (TW) .............................. 97135347 A

(51) Int. Cl.
*G09G 5/10* (2006.01)
*H04N 5/57* (2006.01)
(52) U.S. Cl.
USPC .......................................... 345/690; 348/687
(58) Field of Classification Search
None
See application file for complete search history.

(56) References Cited

U.S. PATENT DOCUMENTS

| 5,956,015 A * | 9/1999 | Hino ............................. 345/600 |
| 7,468,721 B2 * | 12/2008 | Nakano ........................ 345/102 |
| 7,592,996 B2 * | 9/2009 | Brown Elliott et al. ....... 345/102 |
| 2008/0252572 A1 * | 10/2008 | Kang et al. ...................... 345/77 |
| 2008/0303918 A1 * | 12/2008 | Keithley ..................... 348/223.1 |

FOREIGN PATENT DOCUMENTS

| CN | 1551707 | 12/2004 |
| CN | 1637823 | 7/2005 |

* cited by examiner

*Primary Examiner* — Daniell L Negron
(74) *Attorney, Agent, or Firm* — Liu & Liu

(57) ABSTRACT

A brightness adjuster generating an image output to a panel, which displays the corresponding image according to the image output. The image output includes a red output signal, a green output signal, and a blue output signal. The brightness adjuster includes a determination unit, a calculation unit, and a digital to analog converting unit. The determination unit determines a main input signal according to a red input signal, a green input signal, and a blue input signal. The calculation unit adjusts the red, the green, and the blue input signals according to the main input signal. The digital to analog converting unit transforms the adjusted red, the adjusted green, and the adjusted blue input signals into the red, the green, and the blue output signals.

11 Claims, 8 Drawing Sheets

BRIGHTNESS ADJUSTER, ADJUSTMENT METHOD, AND ELECTRONIC SYSTEM UTILIZING THE SAME

CROSS REFERENCE TO RELATED APPLICATIONS

This Application claims priority of Taiwan Patent Application No. 97135347, filed on Sep. 15, 2008, the entirety of which is incorporated by reference herein.

BACKGROUND OF THE INVENTION

1. Field of the Invention

The invention relates to an adjuster, and more particularly to a brightness adjuster for a panel.

2. Description of the Related Art

Because cathode ray tubes (CRTs) are inexpensive and provide high definition, they are utilized extensively in televisions and computers. With technological development, new flat-panel displays are continually being developed. When a larger display panel is required, the weight of the flat-panel display does not substantially change when compared to CRT displays.

For flat-panel displays, power saving is an important issue. A conventional power saving method is to add a white pixel with high efficiency and reduce brightness of red, green, and blue pixels. However, this method results in color saturation being reduced.

Another conventional power saving method utilizes complex expressions and utilizes a frame memory to store data of a previous frame. However, this method increases costs.

BRIEF SUMMARY OF THE INVENTION

The present invention proposes a brightness adjuster to generate an image output to a panel. The panel displays a corresponding image according to the image output. The image output comprises a red output signal, a green output signal, and a blue output signal. An exemplary embodiment of a brightness adjuster comprises a determination unit, a calculation unit, and a digital to analog converting unit. The determination unit determines a main input signal according to a red input signal, a green input signal, and a blue input signal. The calculation unit adjusts the red, the green, and the blue input signals according to the main input signal. The digital to analog converting unit transforms the adjusted red, the adjusted green, and the adjusted blue input signals into the red, the green, and the blue output signals.

The present invention also provides a brightness adjustment method which includes receiving a red input signal, a green input signal and a blue input signal; determining a main input signal according to the red input signal, the green input signal and the blue input signal; adjusting the red input signal, the green input signal and the blue input signal according to the main input signal and transforming the adjusted red input signal, the adjusted green input signal and the adjusted blue input signal into a red output signal, a green output signal and a blue output signal. Wherein, the red input signal, the green input signal and the blue input signal are digital signals. The red output signal, the green output signal and the blue output signal are analog signals.

The present invention also provides an electronic system which comprises a panel and a brightness adjuster. The panel displays a corresponding image according to an image output. The image output comprises a red output signal, a green output signal, and a blue output signal. The brightness adjuster comprises a determination unit, a calculation unit, and a digital to analog converting unit. The determination unit determines a main input signal according to a red input signal, a green input signal, and a blue input signal. The calculation unit adjusts the red, the green, and the blue input signals according to the main input signal. The digital to analog converting unit transforms the adjusted red, the adjusted green, and the adjusted blue input signals into the red, the green, and the blue output signals.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
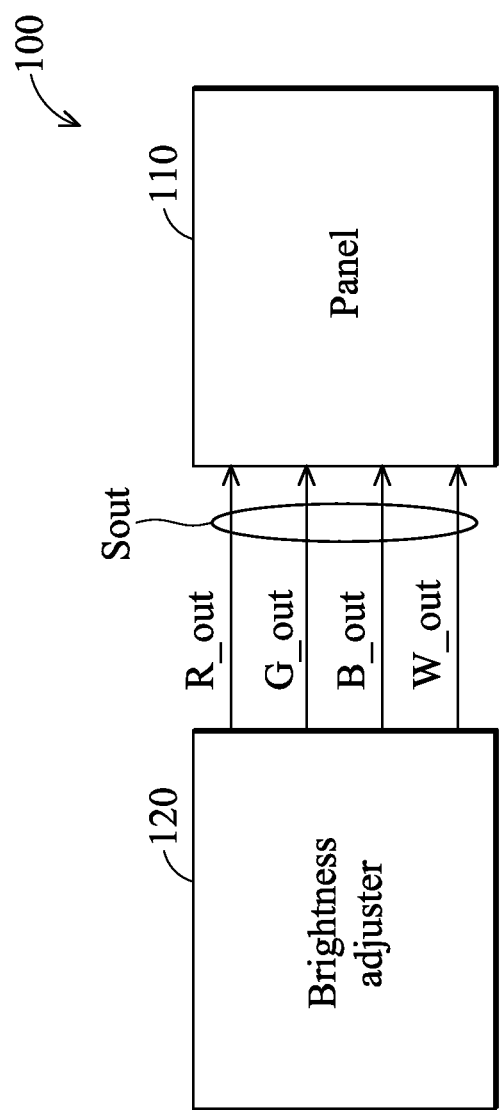
FIG. 1 is a schematic diagram of an exemplary embodiment of an electronic system.

FIG. 1 is a schematic diagram of an exemplary embodiment of an electronic system. The electronic system 100 may be a personal digital assistant (PDA), a cellular phone, a digital camera (DSC), a television, a global positioning system (GPS), a car display, an avionics display, a digital photo frame, a notebook computer (NB), or a personal computer (PC). As shown in FIG. 1, the electronic system 100 comprises a panel 110 and a brightness adjuster 120. The panel 110 which comprises a plurality of pixel units displays a corresponding image according to an image output Sout.

In one embodiment, if each pixel unit comprises three sub-pixels, the image output Sout comprises a red output signal R_out, a green output signal G_out, and a blue output signal B_out. In another embodiment, if each pixel unit comprises four sub-pixels, the image output Sout comprises a red output signal R_out, a green output signal G_out, a blue output signal B_out, and a white output signal W_out. Since the structure of the pixel unit is well known to those skilled in the field, description is omitted for brevity.

Figure 2:
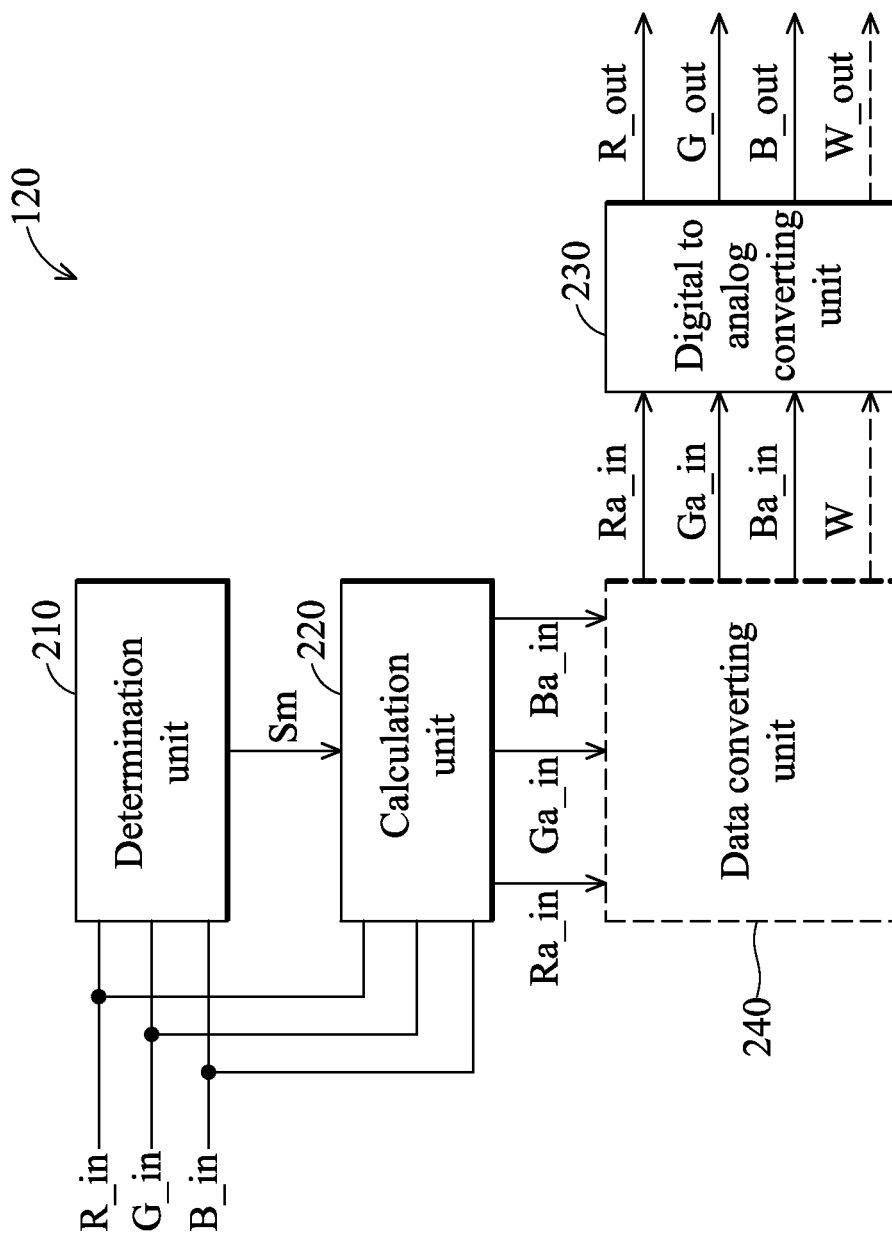
FIG. 2 is a schematic diagram of an exemplary embodiment of the brightness adjuster.

FIG. 2 is a schematic diagram of an exemplary embodiment of the brightness adjuster. The brightness adjuster 120 comprises a determination unit 210, a calculation unit 220, a digital to analog converting unit 230, and a data converting unit 240. The determination unit 210 determines a main input signal Sm according to a red input signal R_in, a green input signal G_in, and a blue input signal B_in.

In one embodiment, the determination unit 210 determines a main input signal Sm which is the maximum signal among a red input signal R_in, a green input signal G_in, and a blue input signal B_in. In another embodiment, the determination unit 210 processes the red input signal R_in, the green input signal G_in, and the blue input signal B_in according to a preset condition and determines the maximum signal among the processed red input signal, the processed green input signal, and the processed blue input signal to be the main input signal Sm. The preset condition may relate to the panel characteristics.

The calculation unit 220 adjusts the red input signal R_in, the green input signal G_in, and the blue input signal B_in accordance to the main input signal Sm. The adjusted red input signal, the adjusted green input and the adjusted blue input signal are labeled as Ra_in, Ga_in and Ba_in respectively in FIG. 2. In this embodiment, the calculation unit 220 adjusts the red input signal R_in, the green input signal G_in, and the blue input signal B_in according to the following equation (1):

$$TR = [1 - F*(G_{Sm}/Sbit)] \quad \text{Equation (1)},$$

wherein TR represents a trimming ratio, F represents a preset value, such as 0~1, $G_{Sm}$ represents a gray level value of main input signal, and Sbit represents the number of the gray level.

For example, if the bit depth of an input signal is 8, the number of the gray level (Sbit) is 255. Assuming that the gray level of the red input signal R_in is 100, then the gray level of the green input signal G_in would be 150, the gray level of the blue input signal B_in would be 200, and the preset value F would be 0.2. The gray level value $G_{Sm}$ of the main input signal Sm processed by the determination unit 210 is 200, which is the maximum value among R_in, G_in and B_in in this case. The trimming ratio TR is 0.84 according to equation (1). Thus, the gray level of the adjusted red input signal is 84 (100*0.84), the gray level of the adjusted green input signal is 126 (150*0.84), and the gray level of the adjusted blue input signal is 168 (200*0.84).

Figure 5:
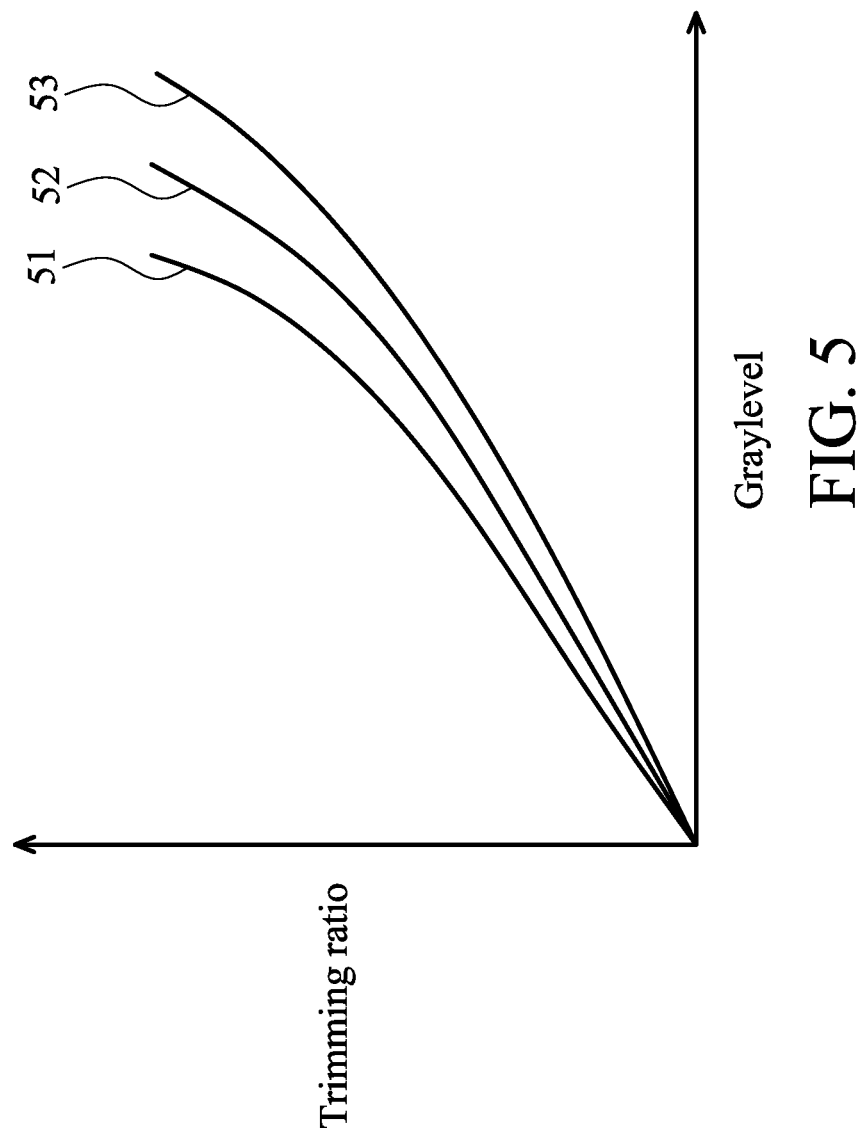
FIG. 5 is a schematic diagram of an exemplary embodiment of an adjustment method.

In another embodiment, the calculation unit 220 adjusts the red input signal R_in, the green input signal G_in, and the blue input signal B_in according to other adjustment methods. FIG. 5 is a schematic diagram of an exemplary embodiment of an adjustment method. The curve 51 is a relationship between the red input signal R_in and the trimming ratio. The curve 52 is a relationship between the green input signal G_in and the trimming ratio. The curve 53 is a relationship between the blue input signal B_in and the trimming ratio. In this embodiment, the calculation unit 220 adjusts the red input signal R_in, the green input signal G_in, and the blue input signal B_in according to the curves 51~53.

The digital to analog converting unit 230 transforms the signals Ra_in, Ga_in, and Ba_in into the red output signal R_out, the green output G_out, and the blue output signal B_out. The digital to analog converting unit 230 is a digital-to-analog converter (DAC).

In this embodiment, the brightness adjuster 120 further comprises a data converting unit 240. The data converting unit 240 generates a white signal W according to the signals Ra_in, Ga_in, and Ba_in. The digital to analog converting unit 230 transforms the white signal W into a white output signal W_out to the panel 110. In some embodiments, the data converting unit 240 can be omitted. Thus, the digital to analog converting unit 230 only outputs the red output signal R_out, the green output signal G_out, and the blue output signal B_out to the panel 110.

Figure 3:
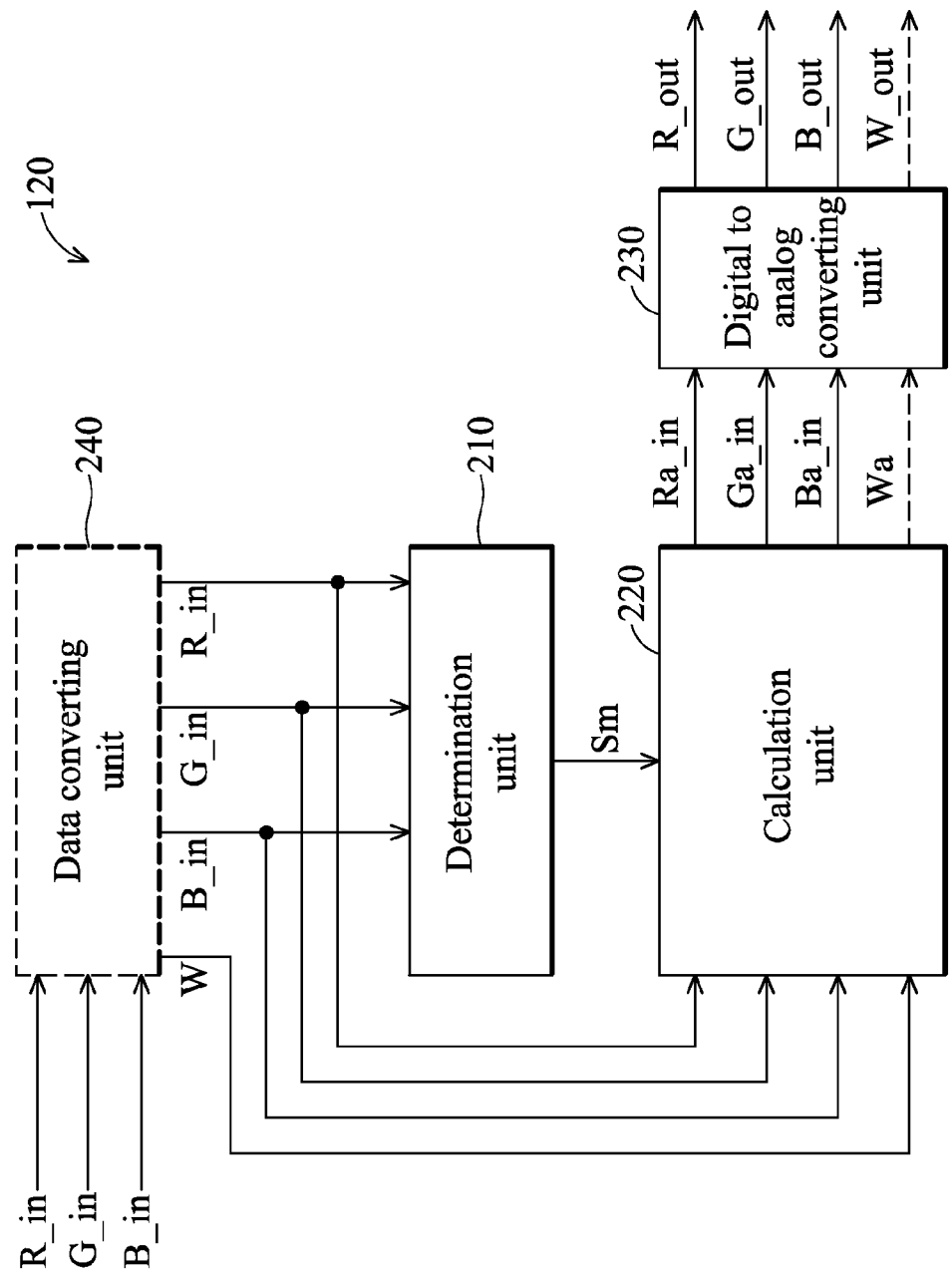
FIG. 3 is a schematic diagram of another exemplary embodiment of the brightness adjuster.

FIG. 3 is a schematic diagram of another exemplary embodiment of the brightness adjuster. FIG. 3 is similar to FIG. 2 except for the data converting unit 240. As shown in FIG. 3, the data converting unit 240 generates a white signal W according to the red input signal R_in, the green input signal G_in, and the blue input signal B_in.

In this embodiment, the calculation unit 220 adjusts the red input signal R_in, the green input signal G_in, the blue input signal B_in, and the white signal W according to the main input signal Sm. The label Ra_in shown in FIG. 3 represents the adjusted red input signal. The label Ga_in shown in FIG. 3 represents the adjusted green input signal. The label Ba_in shown in FIG. 3 represents the adjusted blue input signal. The label Wa shown in FIG. 3 represents the adjusted white signal.

The digital to analog converting unit 230 transforms the adjust signals Ra_in, Ga_in, Ba_in, and Wa into the red output signal R_out, the green output signal G_out, the blue output signal B_out, and a white output signal W_out. The transformed results are transmitted to the panel 110.

Figure 4:
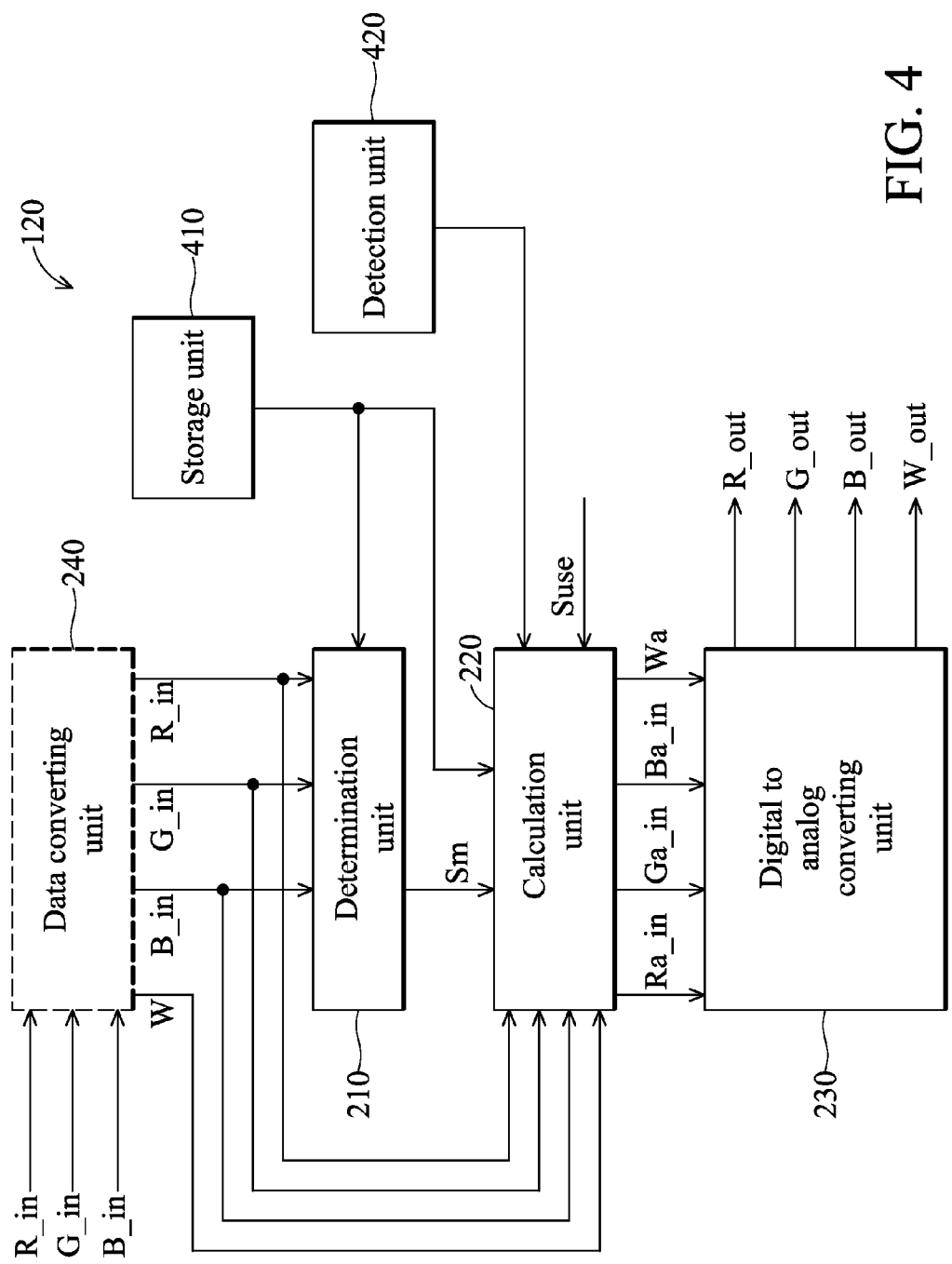
FIG. 4 is a schematic diagram of another exemplary embodiment of the brightness adjuster.

FIG. 4 is a schematic diagram of another exemplary embodiment of the brightness adjuster. FIG. 4 is similar to FIG. 3 except for the addition of a storage unit 410 and a detection unit 420. In some embodiments, the storage unit 410 or the detection unit 420 can be omitted. The operating principles of the storage unit 410 and the detection unit 420 are described in the following.

In this embodiment, the storage unit 410 stores a preset condition, such as the characteristic of the panel. The determination unit 210 processes the red input signal R_in, the green input signal G_in, and the blue input signal B_in according to the stored preset condition. The maximum input signal among the processed red input signal R_in, the green input signal G_in, and the blue input signal B_in is served as the main input signal Sm.

For example, assuming that the gray level of the red input signal R_in is 100, then the gray level of the green input signal G_in would be 50, and the gray level of the blue input signal B_in would be 30. When the red input signal R_in, the green input signal G_in, and the blue input signal B_in are processed by the determination unit 210, the gray level of the processed red input signal may be 30, the gray level of the processed green input signal may be 40, and the gray level of the processed blue input signal may be 60. Since the maximum gray level among the processed red, the processed green, and the processed blue input signals is the processed blue input signal, the gray level of the main input signal Sm is 60.

The panel 110 generally comprises a plurality of luminiferous devices, such as organic light-emitting diodes (OLEDs). In one embodiment, the preset condition stored in storage unit 410 relates to the characteristic (efficiency or lifetime) of the luminiferous devices. In other embodiments, a designer determines the preset condition according to the luminiferous characteristics of the luminiferous devices.

As shown in FIG. 4, the calculation unit 220 adjusts the red input signal R_in, the green input signal G_in, and the blue input signal B_in according to the preset condition stored in storage unit 410 and the main input signal Sm. In one embodiment, the preset condition utilized by the calculation unit 220 is the same as or different from the preset condition utilized by the determination unit 210. In some embodiments, the preset condition stored in storage unit 410 is only utilized by the determination unit 210 or the calculation unit 220.

The detection unit 420 detects the intensity of environment light. Thus, the calculation unit 220 is capable of adjusting the red input signal R_in, the green input signal G_in, and the blue input signal B_in according to the intensity of the environment light. Furthermore, the calculation unit 220 is capable of adjusting the red input signal R_in, the green input signal G_in, and the blue input signal B_in according to a set Suse, which is set by a user. In this embodiment, the calculation unit 220 utilizes the preset condition stored in the storage unit 410, the detected result of the detection unit 420, and the set Suse to adjust the red input signal R_in, the green input signal G_in, and the blue input signal B_in. In other embodiments, the calculation unit 220 utilizes one or a combination of the preset conditions stored in storage unit 410, the detected result of the detection unit 420, and the set Suse.

Figure 6:
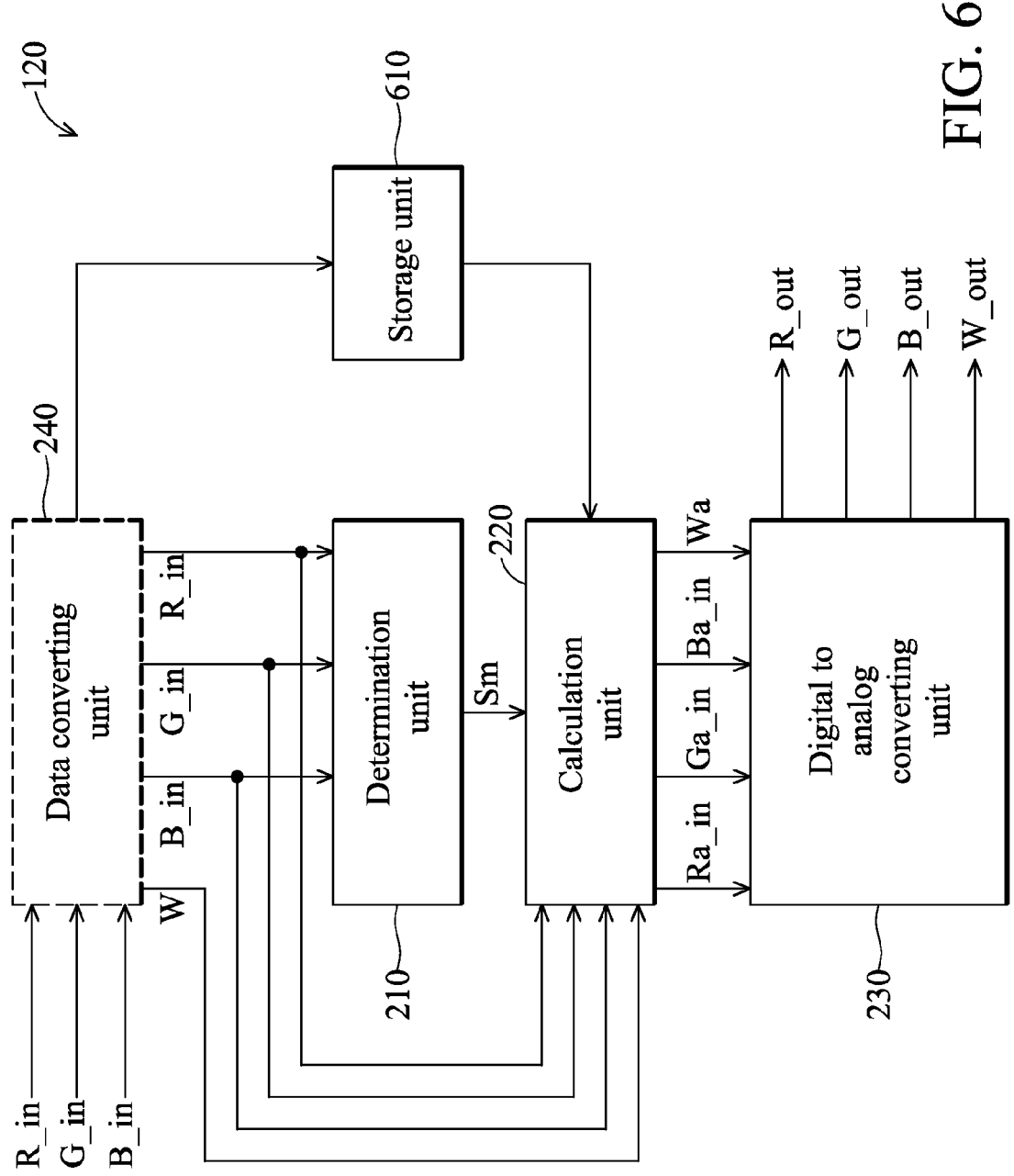
FIG. 6 is a schematic diagram of another exemplary embodiment of the brightness adjuster.

FIG. 6 is a schematic diagram of another exemplary embodiment of the brightness adjuster. FIG. 6 is similar to FIG. 3 except for the storage unit 610. The storage unit 610 accumulates data from the red input signal R_in, the green input signal G_in, and the blue input signal B_in. In other embodiments, the accumulated data of the storage unit 610 relate to one or a combination of the red input signal R_in, the green input signal G_in, and the blue input signal B_in.

The calculation unit 220 adjusts the red input signal R_in, the green input signal G_in, the blue input signal B_in, and the white signal W according to the main input signal Sm and the accumulating result of the storage unit 610. For example, if the accumulating result of the storage unit 610 exceeds a preset value, the trimming ratio of the calculation unit 220 is higher. If the accumulating result of the storage unit 610 is less than the preset value, the trimming ratio of the calculation unit 220 is lower.

Figure 7:
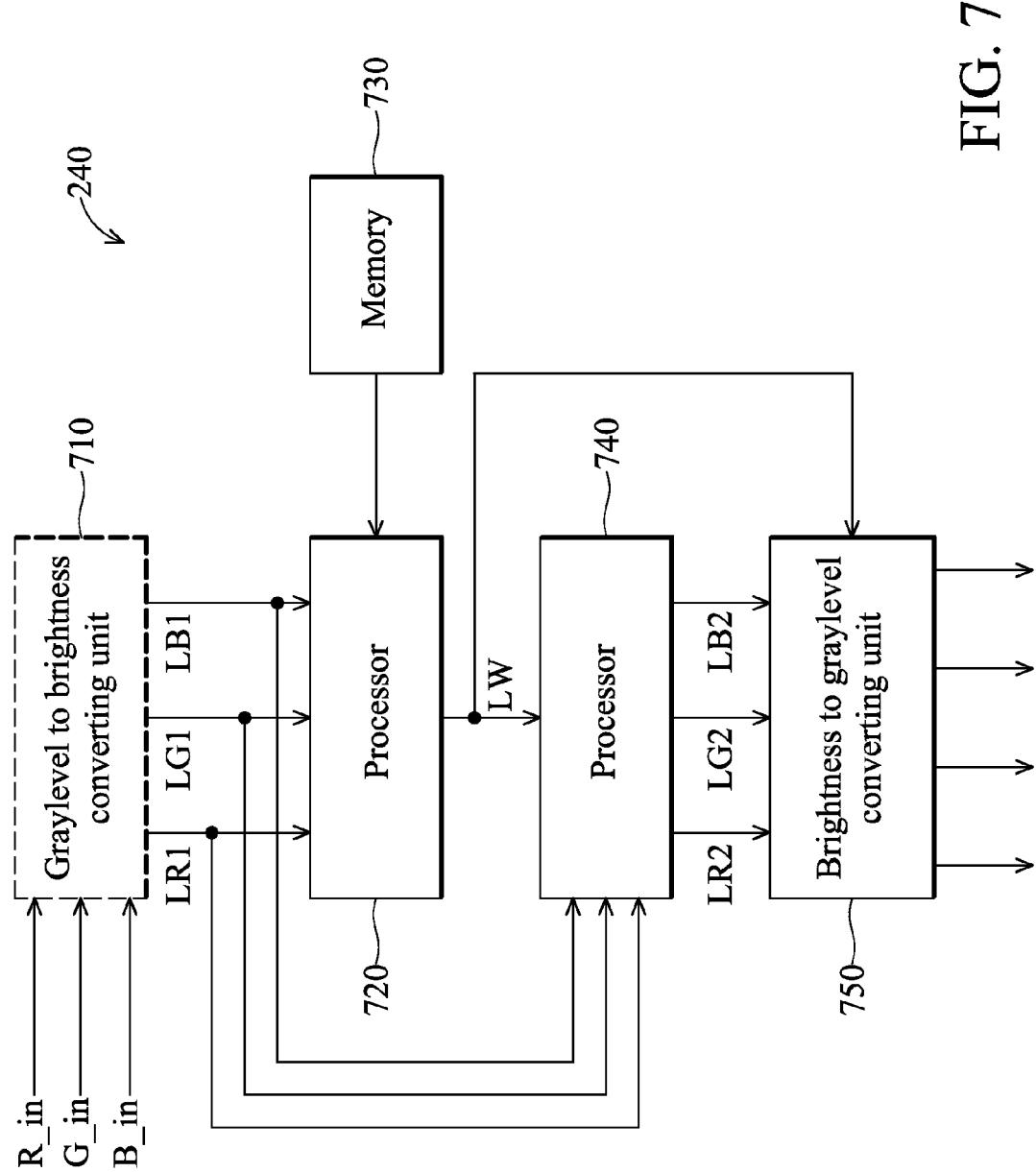
FIG. 7 is a schematic diagram of an exemplary embodiment of the data converting unit.

FIG. 7 is a schematic diagram of an exemplary embodiment of the data converting unit. The gray level to brightness converting unit 710 transforms the red input signal R_in, the green input signal G_in, and the blue input signal B_in into brightness signals LR1, LG1, and LB1. The processor 720 determines and outputs an appropriate white brightness signal LW according to the brightness signals LR1, LG1, and LB1. In this embodiment, the processor 720 determines the white brightness signal LW according to the data stored in the memory 730. The data stored in the memory 730 relates to color coordinates or the characteristic of the panel. The processor 740 adjusts the brightness signals LR1, LG1, and LB1 according to the white brightness signal LW such that the brightness signals LR2, LG2, and LB2 are generated. The brightness to graylevel converting unit 750 transforms the brightness signals LR2, LG2, and LB2 into graylevel signals.

Figure 8:
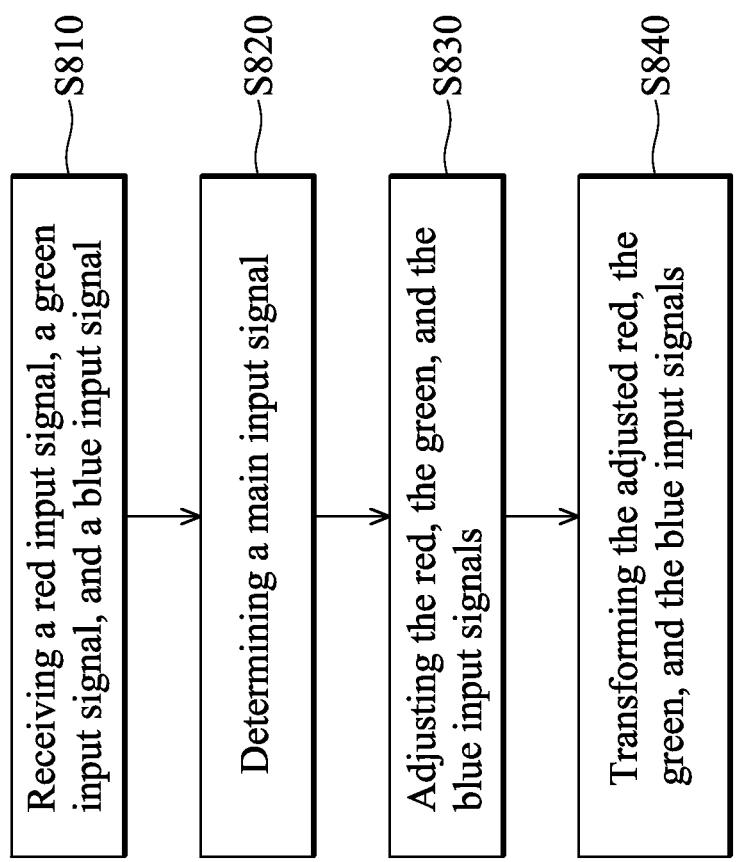
FIG. 8 is a flowchart of an exemplary embodiment of a brightness adjustment method.

FIG. 8 is a flowchart of an exemplary embodiment of a brightness adjustment method. The brightness adjustment method generates an image output to a panel. The panel displays a corresponding image according to the image output. In one embodiment, the image output comprises a red output signal, a green output signal, and a blue output signal. In another embodiment, the image output comprises a red output signal, a green output signal, a blue output signal, and a white output signal.

First, a red input signal, a green input signal, and a blue input signal are received (step S810). In this embodiment, the red, the green, and the blue input signals are graylevel signals.

A main input signal according to the red, the green, and the blue input signals is determined (step S820). In one embodiment, the main input signal is a maximum signal among the red, the green, and the blue input signals. In another embodiment, a preset condition is utilized to process the red, the green, and the blue input signals and then a maximum signal among the processed red, the processed green, and the processed blue input signals is served as the main input signal.

The red, the green, and the blue input signals are adjusted according to the main input signal (step S830). In one embodiment, the red, the green, and the blue input signals are adjusted according to the main input signal and a preset condition. The preset condition relates to the characteristics of the luminiferous devices of the panel, the intensity of environment light, or a set, which is set by a user. In other embodiments, the preset condition relates to the red, the green, and the blue input signals.

Additionally, if the image output comprises a white output signal, before the step S830, a white signal is generated according to the red, the green, and the blue input signals. Then the red input signal, the green input signal, the blue input signal, and the white signal are adjusted according to the main input signal. Furthermore, the step of generating the white signal is executed before or after the step S820.

Then, the adjusted red, the adjusted green, and the adjusted blue input signals are transformed into the red, the green, and the blue output signals (step S840). In this embodiment, the red, the green, and the blue input signals are digital signals. The red, the green, and the blue output signals are analog signals. In some embodiments, the adjusted white signal is transformed into the white output signal. In this case, the white signal is a digital signal and the white output signal is an analog signal.

The red, the green, and the blue input signals are dynamically adjusted and the adjusted results are provided to the panel. Thus, power consumption is reduced and the display quality is not affected.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A brightness adjuster generating an image output to a panel, which displays a corresponding image according to the image output, wherein the image output comprises a red output signal, a green output signal, and a blue output signal, comprising:

a determination unit receiving a red input signal, a green input signal, and a blue input signal, and determining a main input signal according to the red input signal, the green input signal, and the blue input signal;

a calculation unit receiving the red input signal, the green input signal, and the blue input signal, and adjusting the red, the green, and the blue input signals according to the main input signal;

a digital to analog converting unit transforming the adjusted red, the adjusted green, and the adjusted blue input signals into the red, the green, and the blue output signals; and a data converting unit directly receiving the red, the green, and the blue input signals and generating a white signal according to the red, the green, and the blue input signals.

2. The brightness adjuster as claimed in claim 1, wherein the calculation unit adjusts the white signal according to the main input signal and the digital to analog converting unit transforms the adjusted white signal into a white output signal to the panel.

3. The brightness adjuster as claimed in claim 1, wherein the determination unit determines a maximum input signal among the red, the green, and the blue input signals to be the main input signal.

4. The brightness adjuster as claimed in claim 1, wherein the determination unit processes the red, the green, and the blue input signals according to a preset condition and determines a maximum input signal among the processed red, the processed green, and the processed blue input signals, wherein the maximum input signal serves as the main input signal, and wherein the panel further comprises a plurality of luminiferous devices, and wherein the preset condition relates to the characteristics of the luminiferous devices.

5. The brightness adjuster as claimed in claim 1, wherein the calculation unit adjusts the red, the green, and the blue input signals according to a preset condition and the main input signal, wherein the panel further comprises a plurality of luminiferous devices, and wherein the preset condition relates to the characteristics of the luminiferous devices, wherein the preset condition relates to the intensity of environment light, wherein the preset condition relates to a set, which is set by a user, and wherein the preset condition relates to the red, the green, and the blue input signals.

6. A brightness adjustment method generating an image output to a panel, which displays a corresponding image according to the image output, wherein the image output comprises a red output signal, a green output signal, and a blue output signal, comprising:
  receiving a red input signal, a green input signal, and a blue input signal;
  determining a main input signal according to the red, the green, and the blue input signals;
  utilizing a data converting unit to generate a white signal according to the red, the green, and the blue input signals, wherein the data converting unit directly receives the red, the green, and the blue input signals;
  adjusting the red, the green, and the blue input signals according to the main input signal; and
  transforming the adjusted red, the adjusted green, and the adjusted blue input signals into the red, the green, and the blue output signals, wherein the red, the green, and the blue input signals are digital signals and the red, the green, and the blue output signals are analog signals.

7. The brightness adjustment method as claimed in claim 6, further comprising:
  adjusting the white signal according to the main input signal; and
  transforming the adjusted white signal into a white output signal, wherein the white signal is a digital signal and the white output signal is an analog signal.

8. The brightness adjustment method as claimed in claim 6, wherein the main input signal is a maximum input signal among the red, the green, and the blue input signals.

9. The brightness adjustment method as claimed in claim 6, wherein the determining step comprises:
  processing the red, the green, and the blue input signals according to a preset condition; and
  finding a maximum input signal among the processed red, the processed green, and the processed blue input signals and serving the maximum input signal as the main input signal, wherein the panel further comprises a plurality of luminiferous devices and wherein the preset condition relates to the characteristic of the luminiferous devices.

10. The brightness adjustment method as claimed in claim 6, further comprising, adjusting the red, the green, and the blue input signals according to a preset condition and the main input signal.

11. The brightness adjustment method as claimed in claim 10, wherein the panel further comprises a plurality of luminiferous devices and wherein the preset condition relates to the characteristic of the luminiferous devices, wherein the preset condition relates to the intensity of environment light, wherein the preset condition relates to a set, which is set by a user, and wherein the preset condition relates to the red, the green, and the blue input signals.

\* \* \* \* \*